United States Patent [19]

Pike

[11] Patent Number: 5,109,193
[45] Date of Patent: Apr. 28, 1992

[54] INDUCTIVE DIGITAL ENCODER ARRAY

[75] Inventor: Timothy D. Pike, Castro Valley, Calif.

[73] Assignee: f.m.e. Corporation, Hayward, Calif.

[21] Appl. No.: 534,915

[22] Filed: Jun. 7, 1990

[51] Int. Cl.$^5$ .................. G01B 7/14; G08C 19/06; G08C 19/12; H03M 1/22
[52] U.S. Cl. .................. 324/207.17; 324/207.13; 324/207.22; 324/207.24; 324/207.25; 324/207.11; 340/870.31; 341/15
[58] Field of Search .............. 324/207.24, 207.25, 324/207.22, 207.15, 207.16, 207.11, 207.17; 340/870.31, 870.32, 870.34; 341/15; 318/653, 656–661

[56] References Cited

U.S. PATENT DOCUMENTS

| | | | |
|---|---|---|---|
| 2,903,663 | 9/1959 | Collina | 336/134 |
| 3,540,036 | 11/1970 | Packard | 341/15 |
| 3,641,429 | 2/1972 | Cox, Jr. et al. | 324/310 |
| 3,742,340 | 6/1973 | Kiedrowski | 323/324 |
| 4,117,438 | 9/1978 | Kim et al. | 336/200 |
| 4,284,961 | 8/1981 | Landau | 331/324 |
| 4,445,103 | 4/1984 | Chass | 336/323 |
| 4,663,589 | 5/1987 | Fiori, Jr. | 324/340 |
| 4,678,994 | 7/1987 | Davies | 324/194 |
| 4,754,220 | 6/1988 | Shimizu et al. | 324/340 |

*Primary Examiner*—Walter E. Snow
*Attorney, Agent, or Firm*—Townsend and Townsend

[57] ABSTRACT

A multipositionسensor device includes a plurality of inductive-type coils arranged in a first array and a plurality of plates arranged in a second array being juxtaposed and movable relative to the coils, allowing the coils and the plates to register in any plurality of unique couple arrangements. The multiposition sensor device further includes a circuit coupled to each one of the coils, which generates a first signal when a plate is registered with its associated coil and a second signal when no plate is registered with its associated coil. In a preferred embodiment, the coil and plates lie in parallel planes. The coils are angularly spaced along a given circumference in one plane while the plates are angularly spaced along a corresponding circumference in the other plane to allow easy rotation of one array with respect to the other. In one specific embodiment, there are four coils and five plates. The four coils and five plates interact as the plate array is rotated relative to the coil array and yield ten unique plate-coil combinations. These ten unique arrangements create a basis for a decimal counter. Each coil is connected to a separate comparator circuit, thus allowing the formation of a binary-code-decimal encoder. Other embodiments include plates and coils mounted on two linear arrays in parallel planes juxtaposed one another, or plates and coils mounted on rotatable concentric cylinders.

9 Claims, 2 Drawing Sheets

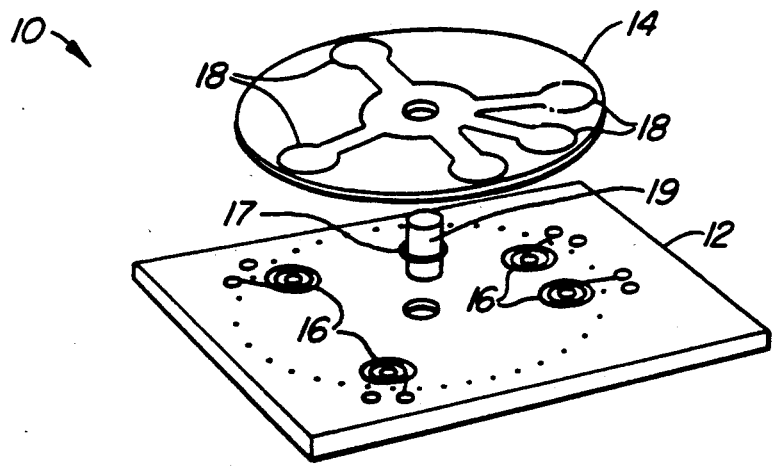
FIG._1.
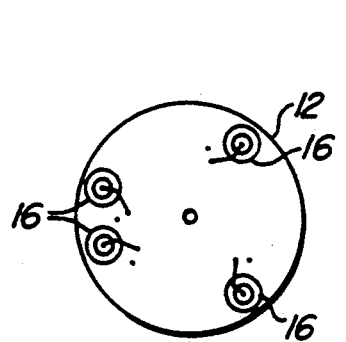
FIG._2A.
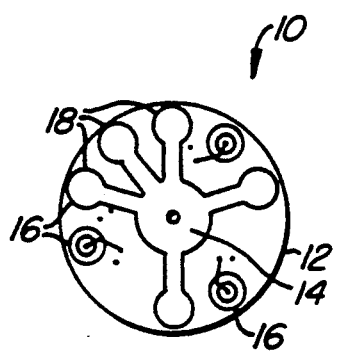
FIG._2C.
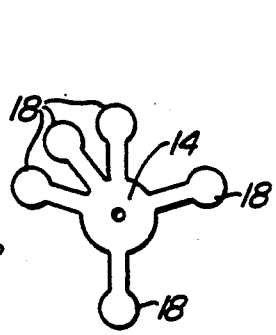
FIG._2B.
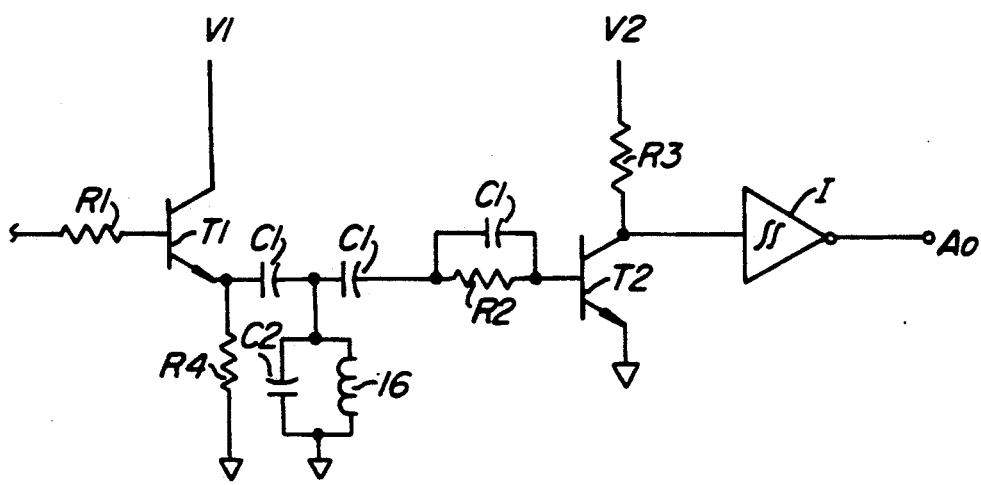
FIG._3.

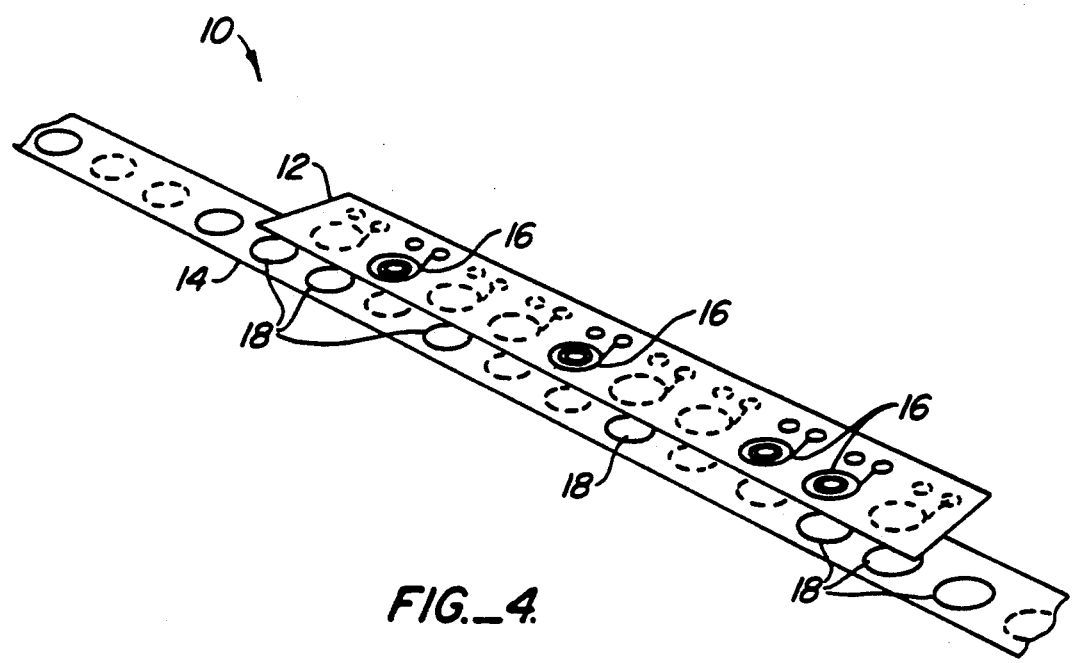
FIG._4.
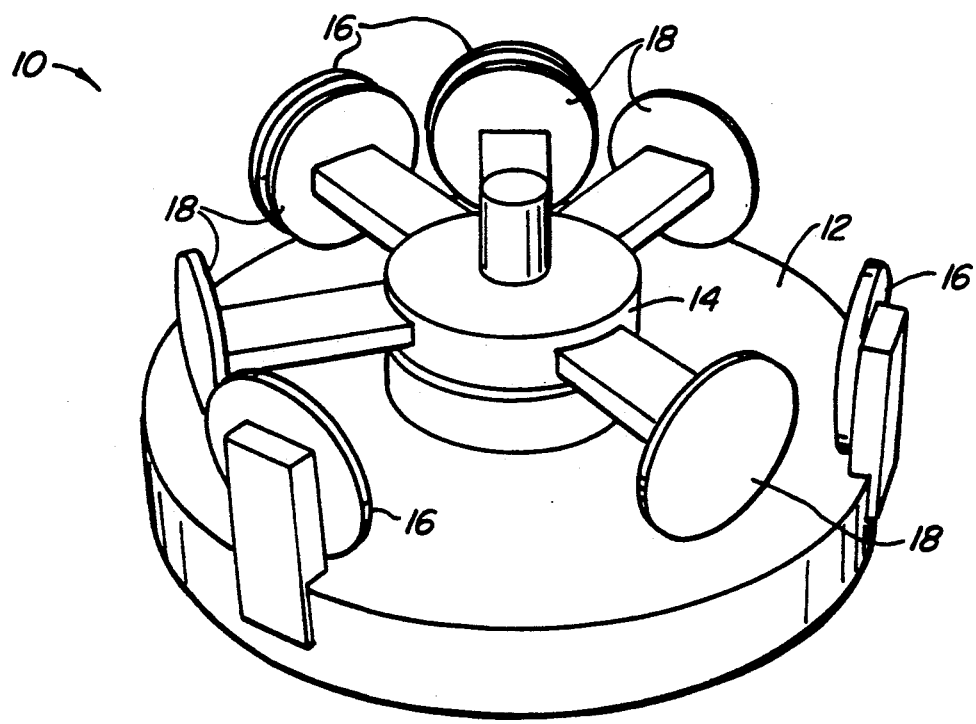
FIG._5.

INDUCTIVE DIGITAL ENCODER ARRAY

BACKGROUND OF THE INVENTION

This invention relates generally to a positional encoding device, and in particular to a digital encoding device.

The use of a positional encoding device is found in many applications. Various methods are used and include direct contact, contact-less, and electro-optical systems. Direct contact systems generally include a rotor and electrical wipers. Frictional contact between the rotor and wipers provides the positional encoding means. However, this frictional movement leads to deterioration of the wipers and rotor.

Contact-less systems involve capacitive or inductive electromagnetic circuits that are analog or digital in application. The analog method generally requires complex signal processing techniques, while the digital method generally requires intricate time dependent signal processing techniques. Both methods of signal processing require complicated circuitry with precise component matching.

Electro-optical systems generally use fiber optics and complex multiplexers. The disadvantages associated with optical systems are that optical systems are relatively expensive to manufacture compared to the contact and contact-less systems and are generally limited to uses involving the processing of a large number of positions (on the order of 1000).

SUMMARY OF THE INVENTION

The present invention provides a contact-less digital encoder that avoids the use of complex time dependent signal processing circuitry, and that is relatively inexpensive to manufacture and maintain compared to large signal encoding methods.

According to the invention, a multiposition sensor device includes a plurality of inductive-type coils arranged in a first array and a plurality of plates arranged in a second array. The plates are juxtaposed and movable relative to the coils, allowing the coils and the plates to register in any of a plurality of unique coupling arrangements. The multiposition sensor device further includes a circuit coupled to each one of the coils, which generates a first signal when a plate is registered with its associated coil and a second signal when no plate is registered with its associated coil.

In a preferred embodiment, the coils and plates lie in parallel planes. The coils are angularly spaced along a given circumference in one plane while the plates are angularly spaced along a corresponding circumference in the other plane to allow easy rotation of one array with respect to the other. In one specific embodiment, there are four coils and five plates. The four coils and five plates interact as the plate array is rotated relative to the coil array and yield ten unique plate-coil combinations. These ten unique arrangements create a basis for a decimal counter.

Each of the four coils is connected to a comparator circuit, and allow for a binary-code-decimal encoder to be formed. The circuit for each coil incorporates the coil as part of a tank circuit, and thus provides one of two outputs, depending on whether or not the coil has a plate registered to it.

In another embodiment, the coils and plates are arranged in linear arrays in parallel planes. And in yet another embodiment, the coil and plate arrays are on the perimeters of concentric cylinder. The plate and coil arrays shift with respect to one another, forming multiple unique plate-coil, combinations.

BRIEF DESCRIPTION OF THE DRAWINGS

FIG. 1 is an exploded perspective view of a ten-position inductive sensor according to the present invention;

FIG. 2A is a top plan view of a coil mount according to the present invention;

FIG. 2B is a top plan view of a detuner for mounting on the coil mount;

FIG. 2C is a top plan view of the ten-position inductive sensor according to FIG. 1;

FIG. 3 is a circuit schematic diagram of a signal processing circuit incorporating one of the coils;

FIG. 4 is another embodiment of the ten-position inductive sensor according to the present invention; and FIG. 5 is yet another embodiment of the ten-position inductive sensor according to the present invention.

DETAILED DESCRIPTION OF SPECIFIC EMBODIMENTS

FIG. 1 is an exploded perspective view of a ten-position inductive sensor 10. Inductive sensor 10 includes a coil mount 12 juxtaposed a detuner 14.

Coil mount 12 is further shown in FIG. 2A. Coil mount 12 has four coils 16 that lie in a first plane and are angularly spaced about a given circumference. Each coil 16 is preferably fabricated on coil mount 12 made of an insulating type of material, such as fiberglass or plastic printed circuit board, using well known printed circuit board fabrication techniques. Preferably, each coil 16 has five windings of 10 mil printed-circuit traces with 10 mil separation. Coils 16 are placed about the circumference in multiples of $\pi/5$ radians. First coil 16 is located at $\pi/5$; second coil 16 is located at $4\pi/5$; third coil 16 is located at $7\pi/5$; and fourth coil 16 is located at $10\pi/5$. It is apparent to one of ordinary skill in the art that the arrangement of the coils is the same whether done clockwise or counterclockwise about the given circumference.

Detuner 14 is shown in FIG. 2B. Detuner 14 is a spider shaped element with five appendages having a plate 18 at the tip of each appendage. The five plates 18 lie in a second plane and are also angularly spaced about a corresponding circumference in multiples of $\pi/5$ radians, much like coils 16. First plate 18 is at $\pi/5$; second plate 18 is located at $2\pi/5$; third plate 18 is located at $3\pi/5$; fourth plate 18 is located at $5\pi/5$; and fifth plate 18 is located at $8\pi/5$. Again, it is apparent to one of ordinary skill in the art that the positioning can be done in a clockwise or counterclockwise direction about the corresponding circumference.

FIG. 2C illustrates how detuner 14 is juxtaposed parallel coil mount 12. Coil mount 12 and detuner 14 share a common central axis allowing plates 18 and coils 16 to coincide. In addition, detuner 14 is separated from coil mount 12 by air, paper or mylar, or other like dielectric material. FIG. 1 shows how a bushing 17 fits on an axis 19 to form air separation between detuner 14 and coil mount 12. Paper or mylar of 2 mil thickness provides adequate separation when used. Ideally, coils 16 and plates 18 are positioned in a circle of the same given circumference. Then, as coil mount 12 and detuner 14 are rotated with respect to one another, coils 16 and plates 18 coincide to form ten (10) unique coil/- plate combinations. Each coil 16 is subsequently connected to a separate signal processing circuit 20 as shown in FIG. 3.

The circuit for each coil incorporates the coil as part of a tank circuit, and thus provides one of two outputs, depending on whether or not the coil has a plate registered to it. Along with coil 16, circuit 20 includes resistors $R_1$, $R_2$, $R_3$, and $R_4$, capacitors $C_1$ and $C_2$, transistors $T_1$ and $T_2$ and integrator I. The implementation of circuit 20 as shown in FIG. 3 is well within the ability of one of ordinary skill in the art. Since there are ten unique coil/plate combinations, the outputs of the four coils can readily be encoded to form a binary-code-decimal (BCD) output.

As plate 81 is brought in proximity with coil 16, the signal in circuit 20 is altered. Furthermore, plate 18 does not actually need to contact coil 16 to alter the signal. This contact-less system allows the plates and coils to avoid the physical wear inherent in contact systems such as rotor/brush devices. In addition, the circuit used to generate a first signal only involves simple components compared to the complex and detailed components needed in well known signal processing or time dependant electromagnetic sensing circuits. Also, due to these simple circuit components and the simplicity of the coil and plate design, the present invention can be easily and inexpensively made compared to electro-optical systems.

The angular displacement of coils 16 and plates 18 about a given circumference is merely one embodiment of the present invention. It would be apparent to those skilled in the art that other embodiments are possible. For example, as shown in FIG. 4, coils 16 could be placed in a linear arrangement in one plane having ten positions, with a coil at the first, fourth, seventh, and tenth position. Also, plates 18 would then be placed in a linear ten section arrangement in another plane parallel to the first, with single coils at the first, second, third, fifth, and eighth position. This linear arrangement requires the plate sequence to be repeated depending upon the direction the plates are to be shifted (left or right) with respect to the coils. All of the numbers used in FIG. 4 are identical and correspond to the same elements found in FIG. 1.

FIG. 5 illustrates yet another embodiment of the present invention. In this embodiment, coils 16 are mounted on the periphery of one cylinder and plates 18 are mounted along a periphery of a second concentric cylinder outside the first cylinder. Coils 16 and plate 18 are positioned so that they face each other when in proximity as detuner 14 rotates with respect to coil mount 12. It is also apparent that coil mount 17 could be the inner cylinder and detuner 14 could be the outer cylinder.

The invention has now been explained with reference to specific embodiments. Other embodiments will be apparent to those of ordinary skill in the art. Such embodiments would include concentric spheres having plates and coils mounted on the inner surface of the outer sphere and on the outer surface of the inner sphere. The concentric cylinders of FIG. 5 could work translationally as well as rotationally with added plates and coils along different sections of the cylinders. In both the linear and rotary embodiments, a second axis could be added to extend the application beyond the decimal based design. It is therefore not intended that the invention be limited except as indicated by the appended claims.

What is claimed:

1. A multi-position digital sensor apparatus comprising:
   a first mounting element having a plurality of inductive coils in a first plane positioned in a first selected pattern;
   a second mounting element in a second plane parallel to said first plane, having a plurality of plates positioned in a second selected pattern, said second mounting element being juxtaposed to said first mounting element so that when one of said mounting elements is shifted with respect to the other of said mounting elements said second mounting element and said first mounting element interact to register said plates with said coils in a multiple of unique, discrete plate-coil coupling arrangements, wherein said first pattern and second pattern are circular, with said first pattern having four coils angularly disposed about an axis perpendicular to said first plane in multiples of $\pi/5$ radians, said second pattern having five plates angularly disposed about said axis in multiples of $\pi/5$ radians with said second mounting element rotatably juxtaposed to said first mounting element such that when said second mounting element is displaced in multiples of $\pi/5$ radians about said axis, said second mounting element and said first mounting element interact to register said plates with said coils in ten unique plate-coil coupling arrangements; and
   a plurality of circuits, each circuit having an input terminal coupled to a respective one of said coils and an output terminal, each circuit operating to provide a first signal level at said output terminal when one of said plates is registered to its associated coil and a second signal level when no plate is registered to its associated coil.

2. A ten-position sensor apparatus comprising:
   a stationary element having four inductive coils in a first array angularly disposed about an axis perpendicular to said first array in multiples of $\pi/5$ radians;
   a rotary element having five plates in a second array angularly disposed about said axis in multiples of $\pi/5$ radians with said rotary element juxtaposed to said stationary element such that when said rotary element is displaced in multiples of $\pi/5$ radians about said axis, said rotary element and said stationary element interact to register said plates with said coils in ten unique plate-coil coupling arrangements; and
   first, second, and fourth comparator circuits, each coupled to a respective one of said four coils, each circuit having an output terminal, each circuit operating to provide a first signal level at said output terminal when one of said plates is registered to its associated coil and a second signal level when no plate is registered to its associated coil.

3. The sensor apparatus in claim 2 wherein said first and second arrays are concentric cylinders with said plates positioned on the perimeter of a first cylinder and said coils positioned on the perimeter of a second cylinder.

4. The apparatus according to claim 2 wherein said output terminals correspond to a four-bit input for a binary-code decimal encoder.

5. A ten-position sensor apparatus comprising:
   a stationary element having four inductive coils in a first plane placed along a line in selected positions;

a sliding element having nine plates in a second plane placed along a line in selected positions, said sliding element being juxtaposed to said stationary element so that when said sliding element is shifted along said line, said sliding element and said stationary element interact to register said plates with said coils in ten unique plate-coil coupling arrangements; and four circuits, each coupled to a respective one of said four coils, each circuit having an output terminal, each circuit operating to provide a first signal level at said output terminal when one of said plates is registered to its associated coil and a second signal level when no plate is registered to its associated coil.

6. The apparatus according to claim 5 wherein said output terminals correspond to a four-bit input for a binary-code decimal encoder.

7. A ten-position sensor apparatus comprising:

a stationary element having a first, second, third, and fourth inductive coils, each coil being placed in a first array angularly disposed about an axis perpendicularly to said first array, with said first coil at $\pi/5$ radians, said second coil at $4\pi/5$ radians, said third coil at $7\pi/5$ radians and said fourth coil at $10\pi/5$ radians;

a rotary element having a first, second, third, fourth and fifth plates, each plate being placed in a second array angularly displaced about said axis, with said first plate at $\pi/5$ radians, said second plate at $2\pi/5$ radians, said third plate at $3\pi/5$ radians, said fourth plate at $5\pi/5$ radians, and said fifth plate at $8\pi/5$ radians, said rotary element being juxtaposed to said stationary element such that when said rotary element is rotated in multiples of $\pi/5$ radians about said axis, said rotary element and said stationary element interact to register said plates with said coils in ten unique plate-coil coupling arrangements; and first, second, third and fourth comparator circuits, each coupled to a respective one of said coils, each circuit having an output terminal, each circuit operating to provide a first signal level at said output terminal when one of said plates is registered to its associated coil and a second signal level when no plate is registered to its associated coil.

8. The sensor apparatus in claim 8 wherein said first and second arrays are concentric cylinders with said plates positioned on the perimeter of a first cylinder and said coils positioned on the perimeter of a second cylinder.

9. A multi-position sensor apparatus comprising:

a first mounting element having a plurality of inductive coils in a first plane positioned in a first selected pattern;

a second mounting element in a second plane parallel to said first plane, having a plurality of plates positioned in a second selected pattern, said second mounting element being juxtaposed to said first mounting element so that when one of said mounting elements is shifted with respect to the other of said mounting elements said second mounting element and said first mounting element interact to register said plates with said coils in a multiple of unique plate-coil coupling arrangements, wherein said first pattern and second pattern are circular, with said first pattern having four coils angularly disposed about an axis perpendicular to said first plane in multiples of $\pi/5$ radians, said second pattern having five plates angularly disposed about said axis to multiples of $\pi/5$ radians with said second mounting element rotatably juxtaposed to said first mounting element such that when said second mounting element is displaced in multiples of $\pi/5$ radians about said axis, said second mounting element and said first mounting element interact to register said plates with said coils in ten unique plate-coil coupling arrangements; and a plurality of circuits, each coupled to a respective one of said coils, each circuit having an output terminal, each circuit operating to provide a first signal level at said output terminal when one of said plates is registered to its associated coil and a second signal level when no plate is registered to its associated coil.

* * * * *